(12) United States Patent
Clavier

(10) Patent No.: US 7,339,321 B2
(45) Date of Patent: Mar. 4, 2008

(54) DISCHARGE-LAMP BALLAST IN PARTICULAR FOR A VEHICLE HEADLIGHT

(75) Inventor: Philippe Clavier, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/334,111

(22) Filed: Jan. 17, 2006

(65) Prior Publication Data

US 2006/0158123 A1 Jul. 20, 2006

(30) Foreign Application Priority Data

Jan. 17, 2005 (FR) .................... 05 00486

(51) Int. Cl.
*B60Q 1/02* (2006.01)
*B60L 1/14* (2006.01)

(52) U.S. Cl. ........................ 315/82; 307/10.8
(58) Field of Classification Search ................ 315/77, 315/82; 307/10.1, 10.8
See application file for complete search history.

(56) References Cited

U.S. PATENT DOCUMENTS

| 5,036,256 A |   | 7/1991 | Garrison et al. ............ 315/308 |
| 5,313,142 A | * | 5/1994 | Wong ........................ 315/205 |
| 5,541,482 A | * | 7/1996 | Siao ........................... 315/248 |
| 5,552,976 A |   | 9/1996 | Munro et al. ................. 363/39 |
| 6,337,800 B1 |   | 1/2002 | Chang ........................ 363/37 |
| 6,556,463 B1 |   | 4/2003 | La Dret et al. ............. 363/132 |
| 7,061,345 B2 | * | 6/2006 | Misu et al. ................. 333/187 |

FOREIGN PATENT DOCUMENTS

| EP | 1 484 201 | 12/2004 |
| FR | 2 703 555 | 10/1994 |

OTHER PUBLICATIONS

DIALOG Abstract of FR 2 703 555.
Search Report for corresponding French Application 05 00 486.

* cited by examiner

*Primary Examiner*—Thuy Vinh Tran
(74) *Attorney, Agent, or Firm*—Morgan & Finnegan, LLP

(57) ABSTRACT

Ballast comprising input terminals receiving a DC voltage coming from a supply source on the vehicle, a chopping supply circuit functioning at a predetermined chopping frequency in order to supply as an output a voltage supplying the discharge lamp, and a filtering device disposed at the input and intended to reduce radio interference produced by the chopping supply circuit. The chopping supply circuit comprises at least one first filtering capacitor connected between the input terminals and a filtering choke connected in series between one of the input terminals and the chopping supply circuit. In accordance with the invention, the ballast comprises a filtering device which also comprises at least one second filtering capacitor in series with an additional choke. This second capacitor forms with the additional choke a resonance circuit situated between the input terminals and tuned to the chopping frequency.

16 Claims, 4 Drawing Sheets

DISCHARGE-LAMP BALLAST IN PARTICULAR FOR A VEHICLE HEADLIGHT

FIELD OF THE INVENTION

The present invention concerns a discharge-lamp ballast as used for example in a vehicle lighting/signalling device.

The invention finds a preferred, but not exclusive, application in the supply to discharge lamps equipping new generation headlights for vehicles.

BACKGROUND

For the purpose of improving both the light power and the energy efficiency of vehicle headlights, current technical developments are leading to replacing filament lamps with discharge lamps. Unlike conventional bulbs, which were designed to be connected directly to the battery of the vehicle, these new lamps require high voltages, alternating or direct, depending on the operating mode, in order to create and maintain the electrical discharge in the gas.

These high voltages, specific to each type of lamp (around 25 Kv for lighting a xenon lamp), are produced from the onboard voltage by a supply module, which also provides the power regulation, known by the term "ballast".

An example of a ballast adapted to automobile applications is described in U.S. Pat. No. 5,036,256.

In accordance with U.S. Pat. No. 5,036,256, when the discharge lamp is started up, the ballast produces, from the 12 V voltage of the battery, a high DC voltage of 500 to 700 V and a pulse of 25-30 Kv, and then a maintenance voltage of around 90 V. To do this, use is made of a chopping supply functioning at 50 kHz.

In general terms, though discharge lamps have certain advantages over filament lamps, their functioning could be the source of significant radio interference should they be improperly used.

Problems posed by the electromagnetic compatibility (EMC) of this type of equipment are known from the prior art. It is known that the various items of onboard equipment, based more and more on complex electronic systems, may be interfered with, but also that the car radio may be subject to interference, in a way that is obviously much more perceptible to the driver and passengers in the vehicle.

A partial solution to these problems is described in the French patent application FR2703555.

In accordance with FR2703555, the measure provided for limiting the diffusion of electromagnetic radiation consists of producing headlights of compact design by arranging the lamp and at least part of the ballast in the housing. A filtering circuit comprising the coils in series with the lamp and capacitors in parallel is integrated in the connector. However, the radio interference reduction measure taught by FR2703555 concerns only interference created by the arc of the discharge lamp itself, and is completely silent on the noise generated by the chopping supply generally forming part of current ballasts.

Technological advances and the search for better efficiency are leading towards an increase in the operating frequency of the ballast.

Chopping frequencies above 100 kHz, 200 kHz or even 300 kHz are currently used, which corresponds to the "long wave" range in radio broadcasting. Under these circumstances, reducing the radio interference emitted becomes a serious constraint for the ballast and automobile equipment manufacturers.

The European standard CISPR-25, issuing from the work of the Special International Committee on Radio Interference, relating to the "*limits and methods of measuring the characteristics of radio interference for the protection of receivers used on board vehicles*" defined a certain number of constraints for frequencies above 150 kHz. Thus this standard recommends a maximum interference level in pipe mode of 60 dBµV in the frequency band from 150 kHz to 300 kHz on the electrical harness of the vehicle for equipment in class 4.

The general question of the optimization of the EMC in chopping supplies has been studied in detail by electronics engineers. For example, in an application note published in 2003 by the company Texas Instruments and entitled "*Understanding and Optimising Electromagnetic Compatibility in Switchmode Power Supplies*", the authors B. Mammano and B. Carsten review the various known methods of reducing radio interference emitted, whether in radiated mode or pipe mode, and, in the latter case, both in common mode and differential mode.

The basic method for reducing noise in differential mode consists of inserting, between the chopping supply and the electrical system, a filter comprising a choke of several tens of Mh in series and a capacitor of several thousands of Mf in parallel. However, the stray capacitance of such a choke and the stray inductance of a capacitor with such a value, necessarily of the "electrochemical" type, make a filter as simple as this inoperative.

In order to reduce the effects of the equivalent inductance of the capacitor, several capacitors of lower value are associated in parallel, and, in order to limit the stray capacitance of the choke, it is recommended to use a special winding with a single layer.

According to the teaching of this application, LC circuits can also be used in additional stages, damping them as required by means of RC circuits in order to avoid resonances which might lead to overvoltages or self-oscillations.

However, the latter methods have the drawback of making the scheme of the basic filter more complex. The result is an increase in the number of components to be installed, which is prohibitive for a ballast circuit which, as has been seen, must be as compact as possible, without of course mentioning the problem of additional cost.

SUMMARY OF THE INVENTION

The objective of the present invention is to provide an improved ballast designed to provide superior EMC performance while satisfying high constraints of efficacy, simplicity and minimum bulk.

The ballast according to the invention, in particular for a vehicle lighting/signalling device, comprises:

input terminals receiving a DC voltage coming from a supply source of the vehicle, a chopping supply circuit, functioning at a predetermined chopping frequency, in order to supply as an output a voltage supplying the discharge lamp, and filtering means disposed at the input to the ballast, the filtering means being intended to reduce the radio interference produced by the chopping supply circuit and comprising at least one first filtering capacitor connected between the input terminals and a filtering choke connected in series between one of the input terminals and the chopping supply circuit.

In accordance with the invention, the filtering means also comprise at least one second filtering capacitor in series with an additional choke, the second capacitor forming with the additional choke a resonant circuit situated between the input terminals and tuned to the chopping frequency.

It should be emphasised here that the creation of a resonance in a filter intended to reduce the noise generated by a chopping supply runs counter to the practices and general knowledge of a person skilled in the art, since he is on the contrary advised to damp the LC circuits present in the filter. Concerning this practice of a person skilled in the art, the reader may refer to the Texas Instruments application note cited above and concerning the EMC of chopping supplies. According to this note, one way of preventing any malfunctioning of the filter is to add not a choke but a resistor in series with the filtering capacitors.

According to an additional characteristic of this ballast, the second capacitor consists of a plurality of decoupling capacitors in parallel. The second filtering capacitor or the decoupling capacitors of the resonant circuit are preferably of the ceramic type.

According to a first embodiment, the choke of the resonant circuit of the ballast according to the invention is of the surface-mounted component type.

According to another embodiment, the additional choke is of the printed choke type and is formed directly on the surface of the printed circuit supporting the electronic components of the ballast. The second filtering capacitor or the decoupling capacitors of the resonance circuit are preferably of the surface mounted component type, and the printed choke is formed on the surface of the printed circuit opposite to that on which the said capacitors are located.

The above embodiment, with a printed choke, is particularly advantageous with regard to cost. In addition, the test carried out by the inventive entity shows that the printed choke obtained is particularly stable, and the prototype, once empirically adjusted in the laboratory, is perfectly reproducible in mass production.

According to a preferred embodiment of the ballast according to the invention, the chopping frequency is between 150 kHz and 300 kHz, the capacitance of the second capacitor or of each of the decoupling capacitors is around a few μF, and the inductance of the additional choke is around a few tens of nH.

The invention also concerns a use of the ballast as described briefly above in a vehicle subjected to regulatory constraints imposing a level of radio interference below 60 dBμV in a frequency band lying between 150 kHz and higher frequencies.

The invention also concerns a use of the ballast as described briefly above in a vehicle for supplying a xenon lamp.

BRIEF DESCRIPTION OF THE DRAWINGS

Other aspects and advantages of the present invention will emerge more clearly from a reading of the description of particular embodiments which will follow, this description being given by way of non-limiting example and made with reference to the accompanying drawings, in which.

DESCRIPTION OF PREFERRED
EMBODIMENTS OF THE INVENTION

Figure 1:
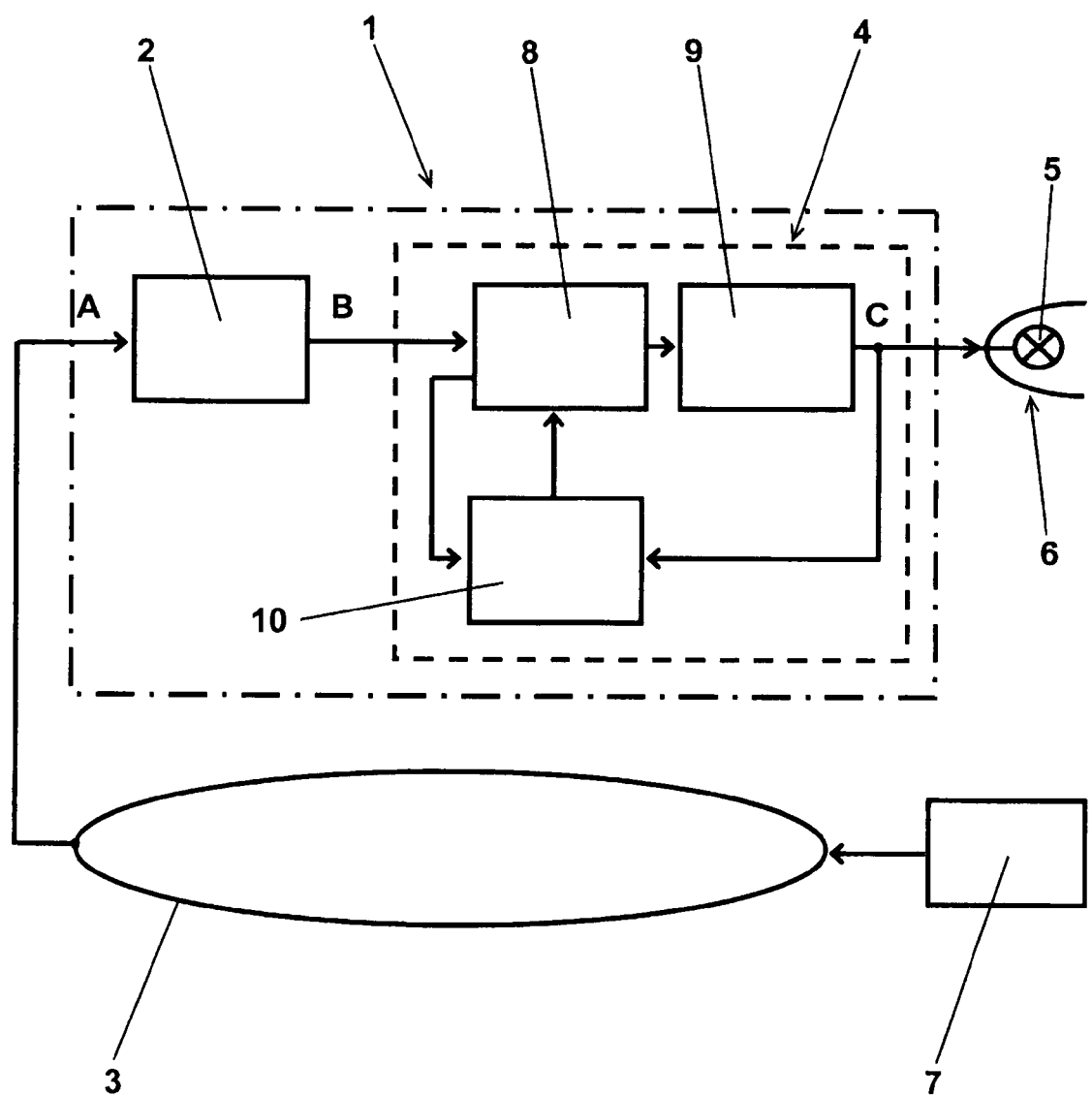
FIG. 1 is a general block diagram of the type of discharge lamp ballast for a vehicle to which the invention relates, and use thereof.

The functional architecture of the type of ballast to which the invention relates is shown in FIG. 1. The electronic module 1 is composed essentially on the one hand of a filtering unit 2 forming the interface A, B with the electrical harness 3 of the vehicle and on the other hand a chopping supply 4 intended to supply as an output C the various voltages necessary for the starting and functioning in continuous mode of the discharge lamp 5 of a headlight 6 from the onboard supply source 7.

The lamp 5 is a high-intensity xenon discharge lamp which requires in particular a starting voltage of around 25 kV. This high voltage is produced from the 12 V voltage of the battery 7 by the chopping supply 4 arranged in a normal manner, that is to say it comprises a DC-DC chopping converter 8, followed by a DC-AC converter 9. The width of the chopping pulses of the DC-DC converter 8 is controlled in a manner known per se according to the charge 5 of the supply 6 by a regulation circuit 10.

Figure 2:
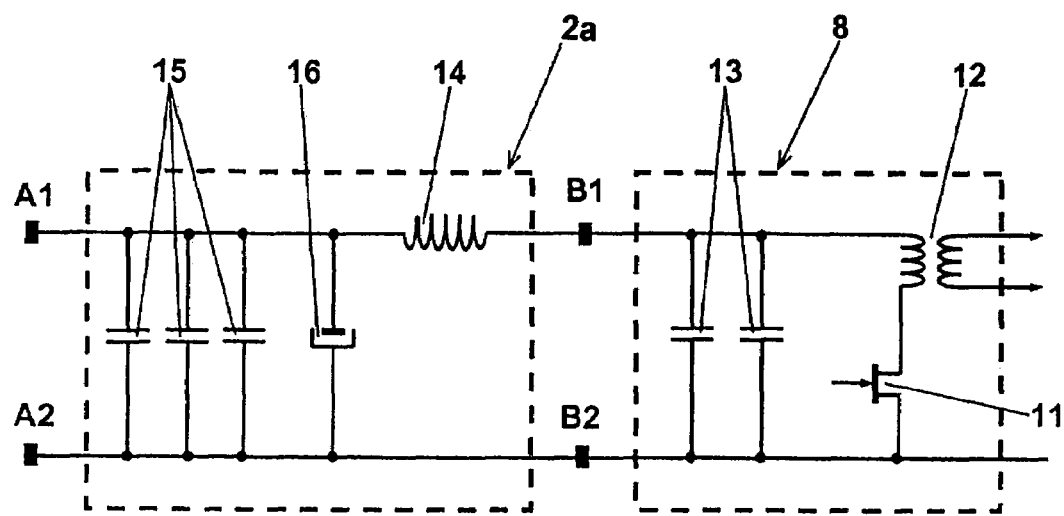
FIG. 2 is the electrical diagram of the filter, and of the DC-DC converter following it, of a ballast of the prior art of the type to which the invention relates.

FIG. 2 shows the electrical diagram of the DC-DC converter 8 used in an existing ballast 1, and in particular an arrangement of a MOSFET power transistor 11 switching the primary current of a step-up transformer 12. The capacitors 13 connected to the primary of the transformer 12 are charged when the transistor 11 is open, and supply energy to the circuit when it is closed.

This transistor 11, controlled by the chopping pulses, is the source of the radio interference at the chopping frequency and of its harmonics, propagating towards the electrical harness of the vehicle 3 through the supply wires B1, B2 of the converter 8.

The filtering unit 2a comprises a choke 14 in series with the +12 V of the supply, which constitutes, with the energy reserve capacitors 13, a conventional filtering cell. The first filtering capacitors 15, 16 are added in front of this cell, in parallel to the input terminals A1, A2 of the filtering unit 2a, and constitutes a low-pass filter.

The filtering means 15, 16 typically have a total capacitance of around a few hundreds of a µF. They comprise an electrochemical capacitor 16, and several ceramic capacitors 15 in parallel. This arrangement is adopted since an electrochemical capacitor 16 has a high stray series inductance which must be compensated for by ceramic capacitors, which have a lower impedance at high frequencies but whose capacity is limited to a few µF.

In order to improve the EMC performance of the ballast described above with reference to FIG. 2, the known solution consisting of increasing the total capacitance of the filtering means 15, 16 in order to gain in dBµV results in adding several capacitors in parallel. Such a solution results in an increase in the number of components and cannot be installed in a ballast in which the density of components is already very high, without risking an increase in the form factor of this ballast. For the same reason, it cannot be envisaged integrating additional filtering cells in the ballast, as taught for example by the application note of Texas Instruments, cited in the introduction.

The many tests carried out by the inventive entity, as well as computer simulations based on models of the "SPICE" type of components, have shown that the stray inductance of the ceramic capacitors 15 used in the ballast of FIG. 2 have a natural resonance of around 2 MHz.

According to the invention, this stray inductance of the ceramic capacitors 15 is used to create, with a single additional choke 17 of very low value, an additional stage rejecting the chopping frequency.

Figure 3:
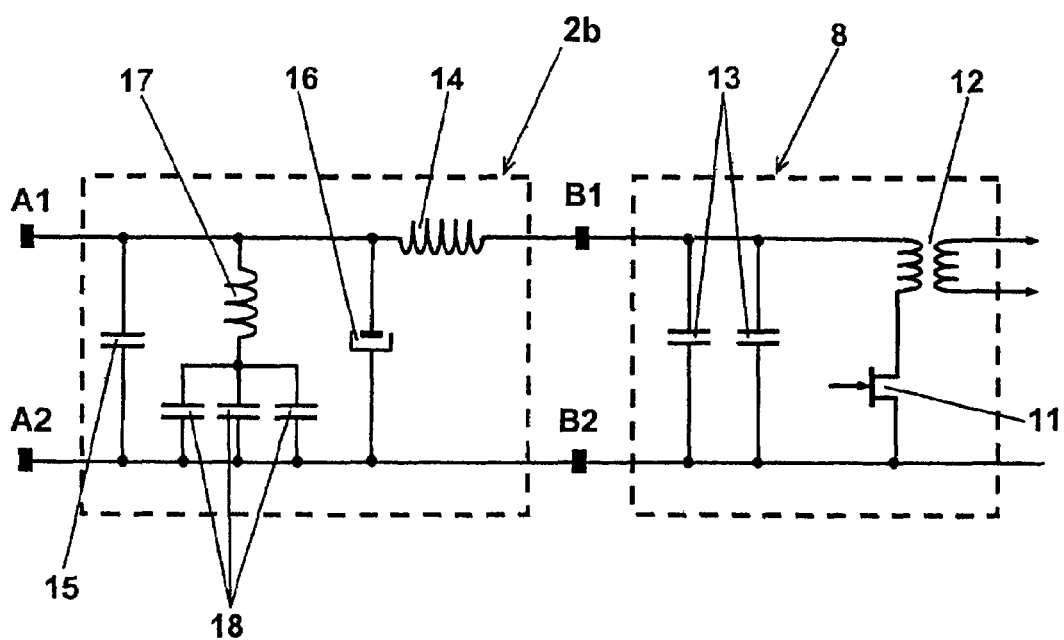
FIG. 3 is the electrical diagram of the filter, and of the DC-DC converter following it, of the ballast according to the invention.

FIG. 3 shows the ballast according to the invention in which the filtering means 2b comprise, between the input terminals A1, A2, an additional choke 17 connected in series with three decoupling capacitors 18 in parallel. The decoupling capacitors 18 and this choke 17 form a series resonance circuit which is tuned to the chopping frequency of the DC-DC converter 8.

At the chopping frequency of the DC-DC converter 8, because of the stray inductance of the decoupling capacitors 18, which is a few µF, the series inductance necessary is only around a few tens of nH.

This inductance value exists in the SMC (surface mounted component) range and this component can therefore be easily implanted on the printed circuit (PCB) of the ballast 1, where an additional electrochemical capacitor would not have fitted.

The low value of the choke 17 also makes it possible, in a variant embodiment, to etch the winding directly on the face of the printed circuit opposite to the components 14, 15, 16, 18, according to the so-called "printed choke" technique.

Figure 4A:
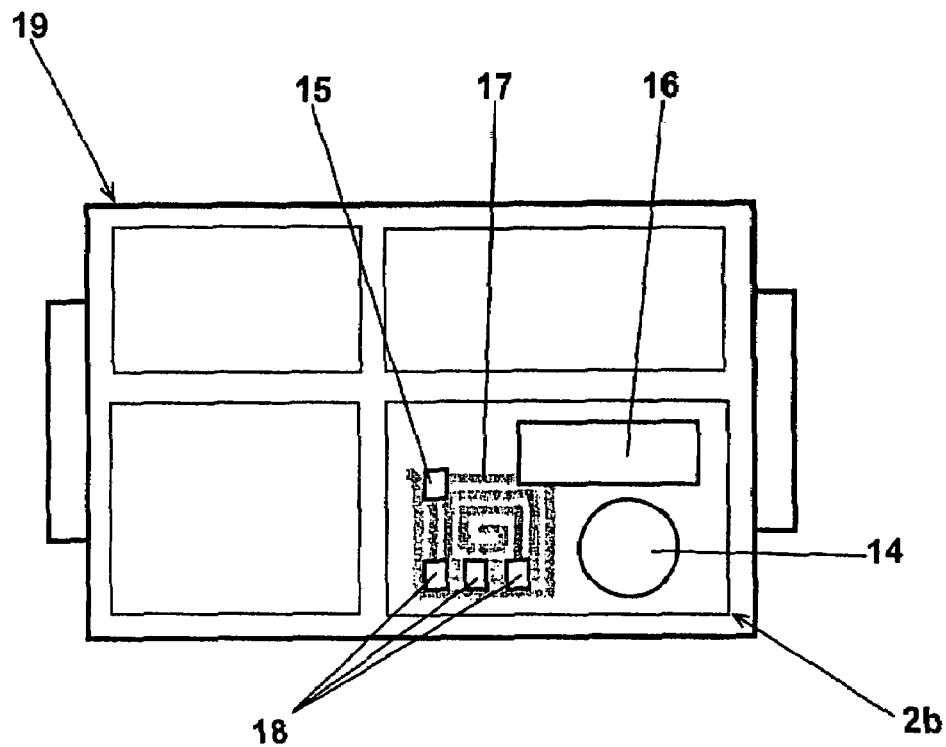
FIGS. 4a and 4b are schematic views of a particular embodiment of the ballast according to the invention, showing the location of a printed choke.
Figure 4B:
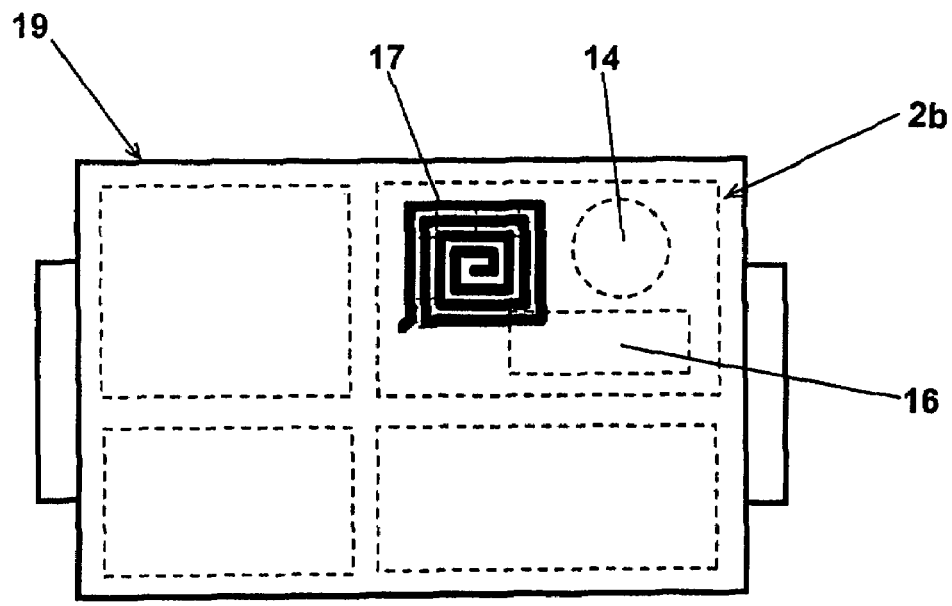

The printed circuit 19 of the ballast 1 according to the invention in the above variant embodiment is depicted schematically with its various functional units in FIGS. 4a and 4b, and in particular the filtering unit 2b.

On the top of the PCB 19 (FIG. 4a) there are arranged a filtering choke 14, an electrochemical filtering capacitor 16, a ceramic filtering capacitor 15, and the three ceramic decoupling capacitors 18 (type CMS).

On the opposite face (FIG. 4b) of the PCB, there is, opposite the decoupling capacitors 18, the additional choke 17 formed by a spiral copper-plated track.

Figure 5:
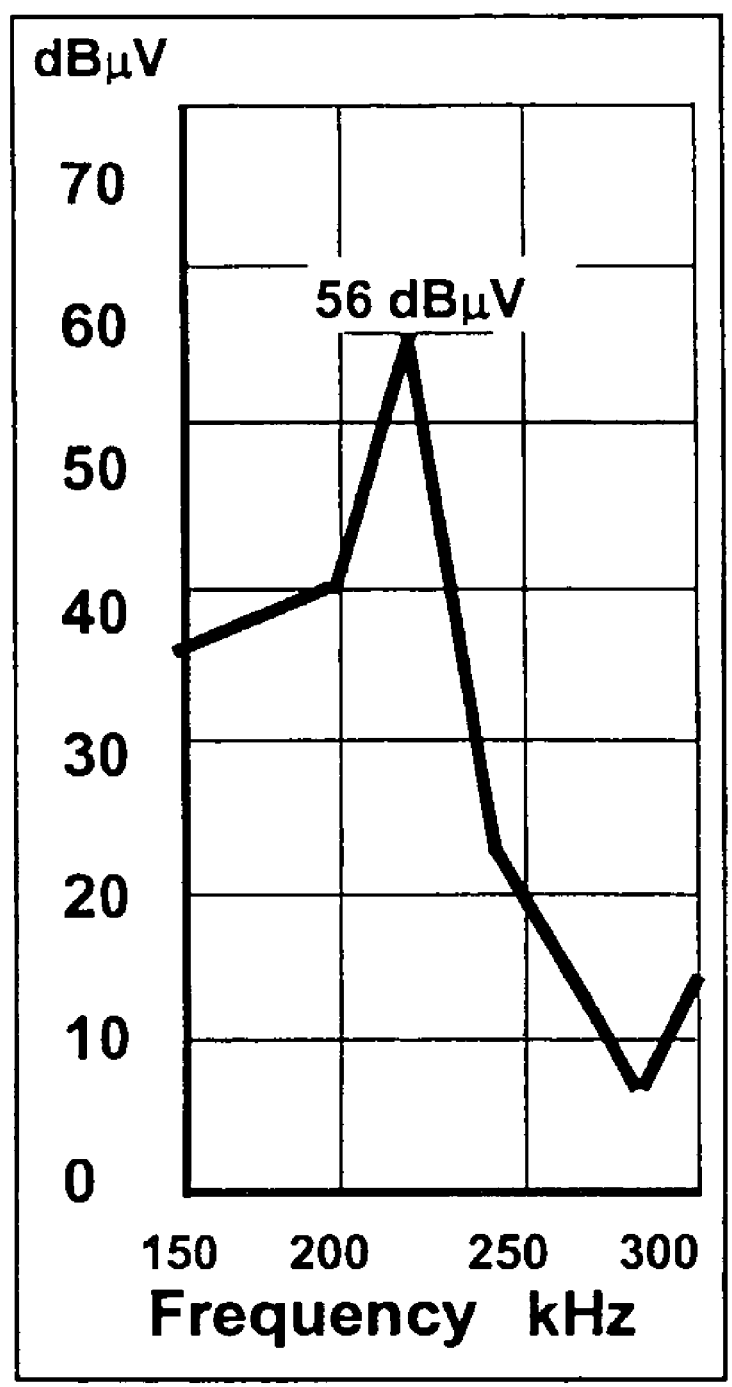
FIG. 5 is the curve depicting the level of radio interference of a vehicle electrical harness obtained with a particular embodiment of the improved ballast according to the invention.

The EMC tests carried out by the inventive entity made it possible to verify that the ballast produced according to the principles of the invention and connected to the electrical harness of a vehicle fully satisfied the standard CISPR-25 for this type of equipment. As shown in FIG. 5, presenting the results in the band from 150 kHz to 300 kHz, the maximum value obtained of 56 dBµV is much lower than the limit of 60 dBµV specified by the standard.

As goes without saying, the invention is not limited solely to the particular embodiments described above and on the contrary embraces all possible variant embodiments.

In particular, the invention is not limited to ballasts with a chopping frequency lying in the frequency band from 150 kHz to 300 kHz. A chopping frequency in a different frequency band can obviously be chosen by a person skilled in the art without from all that departing from the scope of the present invention.

In addition, the number and type of filtering capacitors 15, 16, or decoupling capacitors 18, specified in the description, as well as their arrangement on the PCB, are in no way limiting.

The use of an additional choke 17 of the "CMS" type, and of the "printed choke" type, is only one of the possibilities offered to a person skilled in the art. A ballast 1 where it could be replaced by other types, adapted to the chopping frequency used, would not depart from the scope of the present invention in so far as the inductance and the arrangement of this additional choke 17 results from the following claims.

The invention claimed is:

1. A ballast for a discharge lamp in particular for a vehicle lighting/signalling device, comprising:
   (a) input terminals receiving a DC voltage coming from a supply source of the vehicle,
   (b) a chopping supply circuit, functioning at a predetermined chopping frequency, in order to supply an output voltage to the discharge lamp, and
   (c) a filtering device disposed at the input to the ballast, the filtering device is configured to reduce radio interference produced by the chopping supply circuit and comprising:
      (i) at least one first filtering capacitor connected between the input terminals,
      (ii) a filtering choke connected in series between one of the input terminals and the chopping supply circuit, and
      (iii) at least one second filtering capacitor in series with an additional choke, the second capacitor being configured with the additional choke to form a resonant circuit disposed between the input terminals and tuned to the chopping frequency.

2. The ballast according to claim 1, wherein the second capacitor comprises a plurality of decoupling capacitors in parallel.

3. The ballast according to claim 2, wherein the decoupling capacitors are of a ceramic type.

4. The ballast according to claim 2, wherein the additional choke is of a surface mounted component type.

5. The ballast according to claims 2, wherein the decoupling capacitors are of a surface mounted component type and are formed directly on a surface of a printed circuit supporting at least one other electronic component of the ballast.

6. The ballast according to claim 5, wherein the additional choke is of a printed choke type and is formed on a surface of the printed circuit opposite to the one on which the decoupling capacitors are located.

7. The ballast according to claims 2, wherein the chopping frequency lies between 150 kHz and 300 kHz, the capacitance of each of the decoupling capacitors is around a few μF, and the inductance of the additional choke is around a few tens of nH.

8. The ballast according to claim 2, wherein the inductance of the additional choke is calculated according to the chopping frequency, taking account of stray inductance of each of the decoupling capacitors.

9. The ballast according to claim 1, wherein the second capacitor is of a ceramic type.

10. The ballast according to claim 1, wherein the additional choke is of a surface mounted component type.

11. The ballast according to claims 1, wherein the second capacitor is of a surface mounted component type and is formed directly on a surface of a printed circuit supporting at least one other electronic component of the ballast.

12. The ballast according to claim 11, wherein the additional choke is of a printed choke type and is formed on a surface of the printed circuit opposite to the one on which the second capacitor is located.

13. The ballast according to claims 1, wherein the chopping frequency lies between 150 kHz and 300 kHz, the capacitance of the second capacitor is around a few μF, and the inductance of the additional choke is around a few tens of nH.

14. The ballast according to claim 1, wherein the inductance of the additional choke is calculated according to the chopping frequency, taking account of stray inductance of the second capacitor.

15. A vehicle having the ballast according to claim 1, the vehicle being subjected to a regulatory constraint imposing a level of radio interference below 60 dBμV throughout a whole frequency band lying between 150 kHz and higher frequencies.

16. A vehicle having the ballast according to claim 1 wherein the discharge lamp is a xenon lamp.

* * * * *